(12) United States Patent
Kupferman

(10) Patent No.: US 7,551,383 B1
(45) Date of Patent: Jun. 23, 2009

(54) ADJUSTING VOLTAGE DELIVERED TO DISK DRIVE CIRCUITRY BASED ON A SELECTED ZONE

(75) Inventor: Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 190 days.

(21) Appl. No.: 11/477,999

(22) Filed: Jun. 28, 2006

(51) Int. Cl.
*G11B 5/02* (2006.01)

(52) U.S. Cl. .......................................... 360/67; 360/51
(58) Field of Classification Search ........................ None
See application file for complete search history.

(56) References Cited

U.S. PATENT DOCUMENTS

| | | | |
|---|---|---|---|
| 4,164,648 A | 8/1979 | Chu | |
| 4,298,898 A * | 11/1981 | Cardot | 360/67 |
| 4,675,617 A | 6/1987 | Martin | |
| 4,737,670 A | 4/1988 | Chan | |
| 4,822,144 A | 4/1989 | Vriens | |
| 4,922,141 A | 5/1990 | Lofgren et al. | |
| 5,146,121 A | 9/1992 | Searles et al. | |
| 5,386,187 A | 1/1995 | Bichler et al. | |
| 5,440,250 A | 8/1995 | Albert | |
| 5,440,520 A | 8/1995 | Schutz et al. | |
| 5,446,718 A * | 8/1995 | Shimizu et al. | 369/59.26 |
| 5,479,119 A | 12/1995 | Tice et al. | |
| 5,612,610 A | 3/1997 | Borghi et al. | |
| 5,629,610 A | 5/1997 | Pedrazzini et al. | |
| 5,638,019 A | 6/1997 | Frankeny | |
| 5,640,383 A * | 6/1997 | Kamoto et al. | 369/275.3 |
| 5,661,422 A | 8/1997 | Tice et al. | |
| 5,717,683 A * | 2/1998 | Yoshimoto et al. | 369/275.3 |
| 5,747,976 A | 5/1998 | Wong et al. | |
| 5,748,050 A | 5/1998 | Anderson | |
| 5,777,567 A | 7/1998 | Murata et al. | |
| 5,787,292 A * | 7/1998 | Ottesen et al. | 713/300 |
| 5,808,455 A | 9/1998 | Schwartz et al. | |
| 5,815,043 A | 9/1998 | Chow et al. | |
| 5,994,885 A | 11/1999 | Wilcox et al. | |
| 6,031,426 A | 2/2000 | Yechuri | |
| 6,055,287 A | 4/2000 | McEwan | |

(Continued)

FOREIGN PATENT DOCUMENTS

WO    WO 90/13079    1/1990

OTHER PUBLICATIONS

Burd, et al., "A Dynamic Voltage Scaled Microprocessor System", IEEE Journal of Solid-State Circuits, vol. 35, No. 11, pp. 1571-1580, Nov. 2000.

(Continued)

*Primary Examiner*—Hoa T Nguyen
*Assistant Examiner*—Dismery E Mercedes
(74) *Attorney, Agent, or Firm*—Seed IP Law Group

(57) ABSTRACT

A disk drive includes a disk comprising a plurality of zones, a clock for generating a timing signal having a timing frequency, a voltage controller for providing a supply voltage, and circuitry coupled to the supply voltage and responsive to the timing frequency. Power may be conserved by receiving a host command; selecting one of the plurality of zones based on the host command; and adjusting the timing frequency and the supply voltage provided to the circuitry based at least in part on the selected zone.

29 Claims, 5 Drawing Sheets

U.S. PATENT DOCUMENTS

| | | | |
|---|---|---|---|
| 6,125,157 | A | 9/2000 | Donnelly et al. |
| 6,157,247 | A | 12/2000 | Abdesselm et al. |
| 6,188,206 | B1 | 2/2001 | Nguyen et al. |
| 6,259,293 | B1 | 7/2001 | Hayase et al. |
| 6,259,327 | B1 | 7/2001 | Balistreri et al. |
| 6,285,263 | B1 | 9/2001 | Anderson |
| 6,288,524 | B1 | 9/2001 | Tsujimoto |
| 6,333,652 | B1 | 12/2001 | Iida et al. |
| 6,356,062 | B1 | 3/2002 | Elmhurst et al. |
| 6,396,251 | B2 | 5/2002 | Corva et al. |
| 6,424,184 | B1 | 7/2002 | Yamamoto et al. |
| 6,425,086 | B1 | 7/2002 | Clark et al. |
| 6,449,110 | B1 * | 9/2002 | DeGroat et al. ............... 360/46 |
| 6,449,575 | B2 | 9/2002 | Bausch et al. |
| 6,515,460 | B1 | 2/2003 | Farrenkopf |
| 6,525,585 | B1 | 2/2003 | Iida et al. |
| 6,535,735 | B2 | 3/2003 | Underbrink et al. |
| 6,577,535 | B2 | 6/2003 | Pasternak |
| 6,617,936 | B2 | 9/2003 | Dally et al. |
| 6,622,252 | B1 * | 9/2003 | Klaassen et al. ............ 713/320 |
| 6,657,467 | B2 | 12/2003 | Seki et al. |
| 6,693,473 | B2 | 2/2004 | Alexander et al. |
| 6,721,255 | B1 * | 4/2004 | Gushima et al. ......... 369/59.12 |
| 6,774,694 | B1 | 8/2004 | Stern et al. |
| 6,831,494 | B1 | 12/2004 | Fu et al. |
| 6,868,503 | B1 | 3/2005 | Maksimovic et al. |
| 6,870,410 | B1 | 3/2005 | Doyle et al. |
| 6,885,210 | B1 | 4/2005 | Suzuki |
| 6,909,266 | B2 | 6/2005 | Kernahan et al. |
| 6,970,045 | B1 | 11/2005 | Lichter et al. |
| 6,987,380 | B1 | 1/2006 | Lee |
| 7,015,735 | B2 | 3/2006 | Kimura et al. |
| 7,042,202 | B2 | 5/2006 | Sutardja et al. |
| 7,061,292 | B2 | 6/2006 | Maksimovic et al. |
| 7,102,446 | B1 | 9/2006 | Lee et al. |
| 7,109,695 | B2 | 9/2006 | King |
| 7,129,763 | B1 * | 10/2006 | Bennett et al. ............... 327/262 |
| 7,176,663 | B2 | 2/2007 | Takimoto et al. |
| 7,205,805 | B1 * | 4/2007 | Bennett ...................... 327/158 |
| 7,259,603 | B2 | 8/2007 | Gibson et al. |
| 7,330,017 | B2 | 2/2008 | Dwarakanath et al. |
| 7,330,019 | B1 | 2/2008 | Bennett |
| 7,486,060 | B1 | 2/2009 | Bennett |
| 2003/0093160 | A1 | 5/2003 | Maksimovic et al. |
| 2004/0257056 | A1 | 12/2004 | Huang et al. |
| 2005/0099235 | A1 | 5/2005 | Sakamoto |
| 2005/0134391 | A1 | 6/2005 | Kimura et al. |
| 2005/0140418 | A1 | 6/2005 | Muniandy et al. |
| 2005/0218871 | A1 | 10/2005 | Kang et al. |
| 2005/0218877 | A1 | 10/2005 | Oswald et al. |
| 2005/0251700 | A1 | 11/2005 | Henderson |
| 2006/0129852 | A1 * | 6/2006 | Bonola et al. ............... 713/300 |
| 2006/0161678 | A1 * | 7/2006 | Bopardikar et al. ......... 709/238 |
| 2006/0227861 | A1 | 10/2006 | Maksimovic et al. |

OTHER PUBLICATIONS

Wei, et al., "A Fully Digital, Energy-Efficient, Adaptive Power-Supply Regulator", IEEE Journal of Solid-State Circuits, vol. 34, No. 4, pp. 520-528, Apr. 1999.

A. J. Stratakos, "High-Efficiency Low-Voltage DC-DC Conversion for Portlable Applications", Ph.D. Dissertation, University of California, Berkeley, pp. 1, 124-129, 177-183, 188-191, Dec. 1998.

Marc Fleischmann, "LongRun Power Management, Dynamic Power Management for Crusoe Processors" Transmeta Corporation, Jan. 17, 2001.

Alexander Klaiber, "The Technology Behind Crusoe Processors, Low-Power X86-Compatible Processors Implemented With Code Morphing Software" Transmeta Corporation, Jan. 2000.

Aleksandar Prodic, et al., "Mixed-Signal Simulation of Digitally Controlled Switching Converters," IEEE Compel, pp. 100-105, Jun. 2002.

Jinwen Xiao, et al., "A 4-µA Quiescent-Current Dual-Mode Digitally Controlled Buck Converter IC for Cellular Phone Applications," IEEE Journal of Solid-State Circuits, vol. 39, No. 12, pp. 2342-2348, Dec. 2004.

Shamim Choudhury, "Designing a TMS320F280x Based Digitally Controlled DC-DC Switching Power Supply," Texas Instruments Application Report, http://focus.ti.com, spraab3.pdf, pp. 1-16, Jul. 2005.

"Applications for White LED Driver in Parallel vs. Series," Analog Integrations Corporation (AIC), AIC1845, AN027.pdf, www.analog.com, pp. 1-7, Oct. 2003.

"Power Supply Regulation," printout from Altera website, http://www.altera.com/support/devices/power/regulators/pow-regulators.html, Oct. 2006.

U.S. Appl. No. 11/393,425, filed Mar. 30, 2006, 18 pages.

Lu Yun, et al., "A Current Steering Logic Based Ring Oscillator for High Stability and Lower Noise Applications", High Density Packaging and Microsystem Integration, 2007. HDP '07, International Symposium on, Jun. 26-28, 2007, p. (s) 1-3.

Moore, B., et al., "Design of wireless sub-micron characterization system", VLSI Test Symposium, 2004, Proceedings. 22nd IEEE, Apr. 25-29, 2004, pp. 341-346.

Boit et al., Interaction of Laser Beam with Semiconductor Device (IC), Retrieved Jan. 29, 2009 from http://mikro.ee.tu-berlin.de/hlb/emmi/poster_emmi1.pdf.

Wang et al., "Technology Challenges Motivating Adaptive Techniques", Adaptive Techniques for Dynamic Processor Optimization, Sping US, ISSN 1558-9412, 2008, pp. 1-23.

Wei, Gu-Yeon, "Energy-Efficient I/O Interface Design with Adaptive Power-Supply Regulation", A Dissertation Submitted to the Department of Electrical Engineering and the Committee on Graduate Studies of Stanford University, Jun. 2001, retrieved from http://www-vlsi.stanford.edu/papers/gyw_thesis.pdf on Jan. 29, 2009.

* cited by examiner

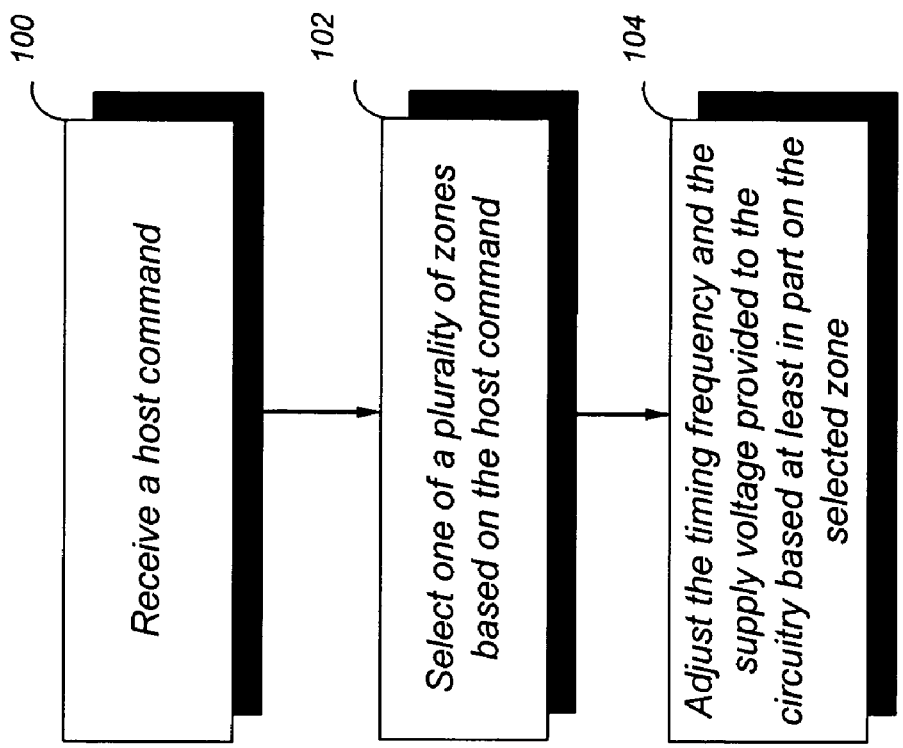

ADJUSTING VOLTAGE DELIVERED TO DISK DRIVE CIRCUITRY BASED ON A SELECTED ZONE

BACKGROUND

1. Field

This invention relates to disk drives and, more particularly, to electrical power supplied to disk drive circuitry.

2. Description of the Related Art

Magnetic disk drives are conventionally designed to store large volumes of data on a plurality of disks mounted on a spindle assembly. In general, each disk includes two disk surfaces capable of storing data. On each disk surface, user data is divided into groups of sectors and stored in concentric circular tracks located between an outside diameter and inside diameter of the disk. Embedded servo information is recorded in servo sectors located in radially continuous narrow wedges along the disk surface.

In order to maximize the data recorded on each disk surface, it is desirable to use zone recording techniques. According to such techniques, the rate or frequency at which data is written to a disk surface increases from the inner tracks to the outer tracks to compensate for the fact that data tracks towards the inside diameter of the disk surface are shorter and can hold less data than tracks near the outside diameter. Thus, a relatively uniform data density may be achieved over the disk surface.

Although the recording rate could theoretically be optimized for each track, zone recording techniques typically utilize a relatively low number of discrete recording frequencies. Accordingly, groups of adjacent tracks may be assigned to an array of zones between the innermost track and the outermost track of the disk surface. For example, there may be ten to 20 zones across a disk surface. Data may then be written at the same recording frequency within each zone, and the recording frequency may increase from the inner zones to the outer zones.

In many disk drive applications, including mobile applications, power conservation is critical. To reduce the power needs of the spindle motor, for example, the prior art discloses disk drives designed to rotate at lower speeds in low-power environments. Thus, these prior art disk drives can rotate at a higher speed when the host computing device is coupled to a wall socket (a relatively abundant source of power), and at a lower speed in a mobile, battery-powered mode.

Operation of a disk drive at multiple speeds, however, has a number of drawbacks. First, the performance of a disk drive at lower speeds is significantly impaired, reducing the utility of the mobile mode. Second, there is the difficulty of maintaining a constant fly-height at different speeds. Finally, operating a disk drive at different speeds presents complex electrical engineering issues. For example, the disk drive must be able to read data that was written at a different speed.

There is therefore a need in the art for power conservation measures that may be efficiently implemented in disk drives.

BRIEF DESCRIPTION OF THE DRAWINGS

FIG. 5 is a flowchart illustrating various steps of one embodiment of the present invention.

DETAILED DESCRIPTION

Figure 1:
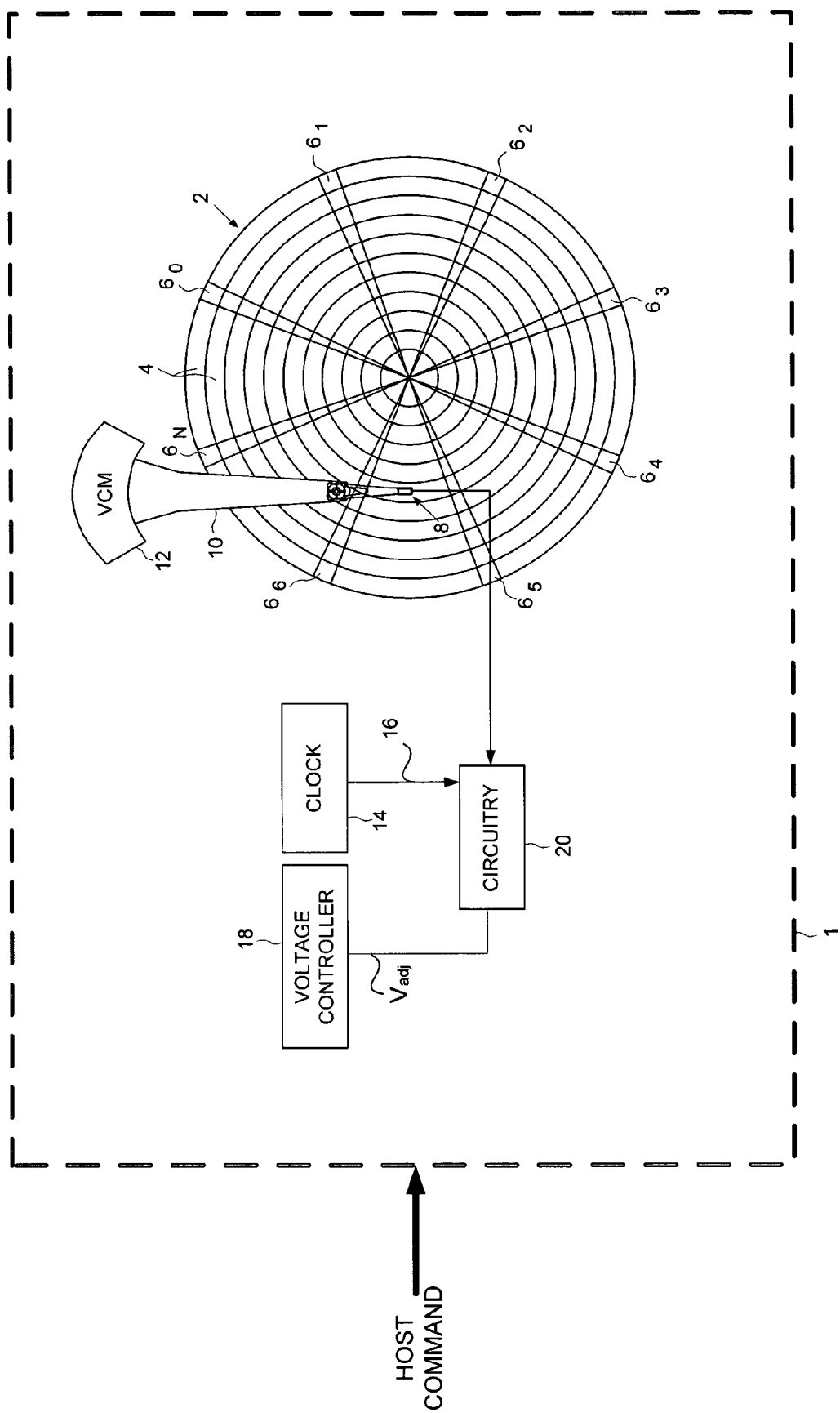
FIG. 1 is a schematic diagram generally illustrating an exemplary disk drive usable to implement an embodiment of the present invention.

Referring to FIG. 1, according to one embodiment of the present invention, disk drive 1 comprises a disk 2 having a plurality of zones 4, wherein a first zone comprises data recorded at a first data rate, a head 8 actuated over the disk 2 for generating a signal representing the data, and a voice coil motor 12 configured to actuate the head 8 over the disk 2 via an actuator arm 10. The disk drive 1 further comprises a clock 14 configured to generate a timing signal 16 having a timing frequency and configured to adjust the timing frequency in response to the first data rate, circuitry 20 responsive to the timing frequency, and a voltage controller 18 configured to adjust a supply voltage $V_{adj}$ provided to the circuitry 20 in response to the first data rate. Although a preferred embodiment of the present invention is described herein in terms of a magnetic disk drive, it may be understood that the methods, circuitry and devices described herein may also be implemented in other disk drives, including, e.g., optical and magneto-optical disk drives.

Disk 2 includes a plurality of zones 4, wherein each zone comprises data recorded at a particular data rate. In one embodiment, groups of adjacent annular regions (not shown in FIG. 1), typically called tracks, may be assigned to an array of zones 4 between the innermost and outermost tracks of the illustrated disk surface of disk 2. In one embodiment, there may be ten to 20 zones across the disk surface. Data may then be written at the same recording frequency (i.e., data rate) within each zone 4, and the recording frequency will increase from the inner zones to the outer zones. In another embodiment, each zone 4 may comprise a single track in order to effectively maximize the data stored on the disk 2. Although disk 2 is illustrated as one disk, other disks may also be included in disk drive 1, and both the top and bottom disk surfaces of disk 2 may be used for data storage.

Head 8 is actuated over disk 2 in order to generate a signal representing the data recorded on the disk 2, thereby accessing any one of the plurality of zones 4.

In a preferred embodiment, head 8 comprises a transducer (not illustrated). The transducer typically includes a writer and a read element. In magnetic recording applications, the transducer's writer may be of a longitudinal or perpendicular design, and the read element of the transducer may be inductive or magnetoresistive. In optical and magneto-optical recording applications, the head 8 may also include an objective lens and an active or passive mechanism for controlling the separation of the objective lens from a surface of the disk. Disk drive 1 further includes a voice coil motor 12 for rotating one or more actuator arms 10 about a pivot in order to actuate the head 8 over the disk 2. Of course, other actuating mechanisms may be used to move the head 8 relative to the disk 2.

Clock 14 generates a timing signal 16 having a timing frequency, and is configured to adjust the timing frequency in response to the data rate of the current zone being accessed or about to be accessed by the head 8. This timing signal 16 may be used to time a variety of operations within disk drive 1. In one embodiment, the clock 14 may be used to time read and/or write operations (either of which may be termed "data access operations"). For example, clock 14 may, in one embodiment, be used to provide a timing signal 16 having a timing frequency at which data is written to the current zone. In another embodiment, an analog read signal representing data detected by the head 8 may be sampled at the timing frequency. In fact, the same clock 14 may be used to time both read and write operations. In other embodiments, multiple clocks may be used. The clock 14 may also be used to time other operations within the disk drive 1, such as data processing operations implemented by other circuitry.

The clock 14 may comprise any circuitry for generating a timing signal 16 with an adjustable frequency. In one embodiment, the clock 14 may comprise a frequency synthesizer. In a preferred embodiment, the frequency synthesizer comprises a voltage-controlled oscillator (VCO), the frequency of which may be controlled by an input voltage. In another embodiment, the frequency synthesizer comprises a reference crystal coupled to at least one multiplier, the multiplier being configured to adjust the frequency output by the reference crystal to a desirable frequency. The clock 14 may be located anywhere within or external to the disk drive 1.

As discussed above, the clock 14 is preferably configured to adjust the timing frequency in response to the data rate of a selected zone. In one embodiment, the circuitry comprising clock 14 may itself detect the data rate of a selected zone and then adjust the timing frequency. For example, the clock 14 may be coupled to a register containing a value indicative of the data rate of a selected zone. In another embodiment, other circuitry within the disk drive 1, such as a controller, may send a signal to the clock 14 causing the timing frequency to adjust in response to the data rate. Preferably, the clock 14 has a feedback or control mechanism by which the timing frequency can be adjusted in response to a change in data rate.

Voltage controller 18 provides an adjustable supply voltage $V_{adj}$ to circuitry 20. Preferably, the voltage controller 18 is configured to adjust this supply voltage $V_{adj}$ in response to the data rate of a selected zone. In one embodiment, the voltage controller 18 adjusts the supply voltage $V_{adj}$ supplied to the circuitry 20 as the timing frequency generated by the clock 14 is also adjusted. The supply voltage $V_{adj}$ and timing frequency may be directly proportional to one another, according to a quadratic or other mathematical relationship.

In one embodiment, the voltage controller 18 supplies power to a single component within the disk drive 1, while in other embodiments, circuitry 20 may be one of a plurality of circuits that receive a supply voltage from voltage controller 18. Moreover, although depicted in FIG. 1 as directly coupled to the voltage controller 18, circuitry 20 may be coupled to the supply voltage directly or indirectly, and may receive only some portion of the entire voltage output by the voltage controller 18. For example, in one embodiment, the voltage controller 18 supplies power to the circuitry 20 through a voltage divider such that the supply voltage $V_{adj}$ is not supplied directly to the circuitry.

The voltage controller 18 may comprise any circuitry configured to deliver power at an adjustable supply voltage $V_{adj}$. In one embodiment, the voltage controller 18 may itself detect the data rate of a selected zone and then adjust the supply voltage $V_{adj}$. For example, the voltage controller 18 may be coupled to or include a register containing a value indicative of the data rate of a selected zone. In another embodiment, other circuitry within the disk drive 1, such as a controller, may send a signal to the voltage controller 18 causing the supply voltage $V_{adj}$ to adjust in response to the data rate. Preferably, the voltage controller 18 has a feedback or control mechanism by which the supply voltage $V_{adj}$ can be adjusted in response to a change in data rate, as discussed in greater detail below.

Circuitry 20 is coupled to the supply voltage $V_{adj}$ and is responsive to the timing frequency provided by the clock 14. The circuitry 20 may be any of the electronic components and/or circuitry located within a disk drive 1. The circuitry 20 may be, inter alia, a pre-amplifier, a read channel, a controller, servo circuitry, or any combination of these components. These and other examples of circuitry are described in greater detail below.

The disk drive 1, in one embodiment, may also be configured to access the inner zones 4 more frequently than the outer zones 4 of the disk 2. By modifying the disk drive 1 in this fashion, although the data rate from the disk 2 may be slower (as the corresponding timing frequency of the clock 14 may also be slower towards the inner zones of the drive), the disk drive 1 should also consume less power, as a lower supply voltage may be provided to certain circuitry 20.

Figure 2:
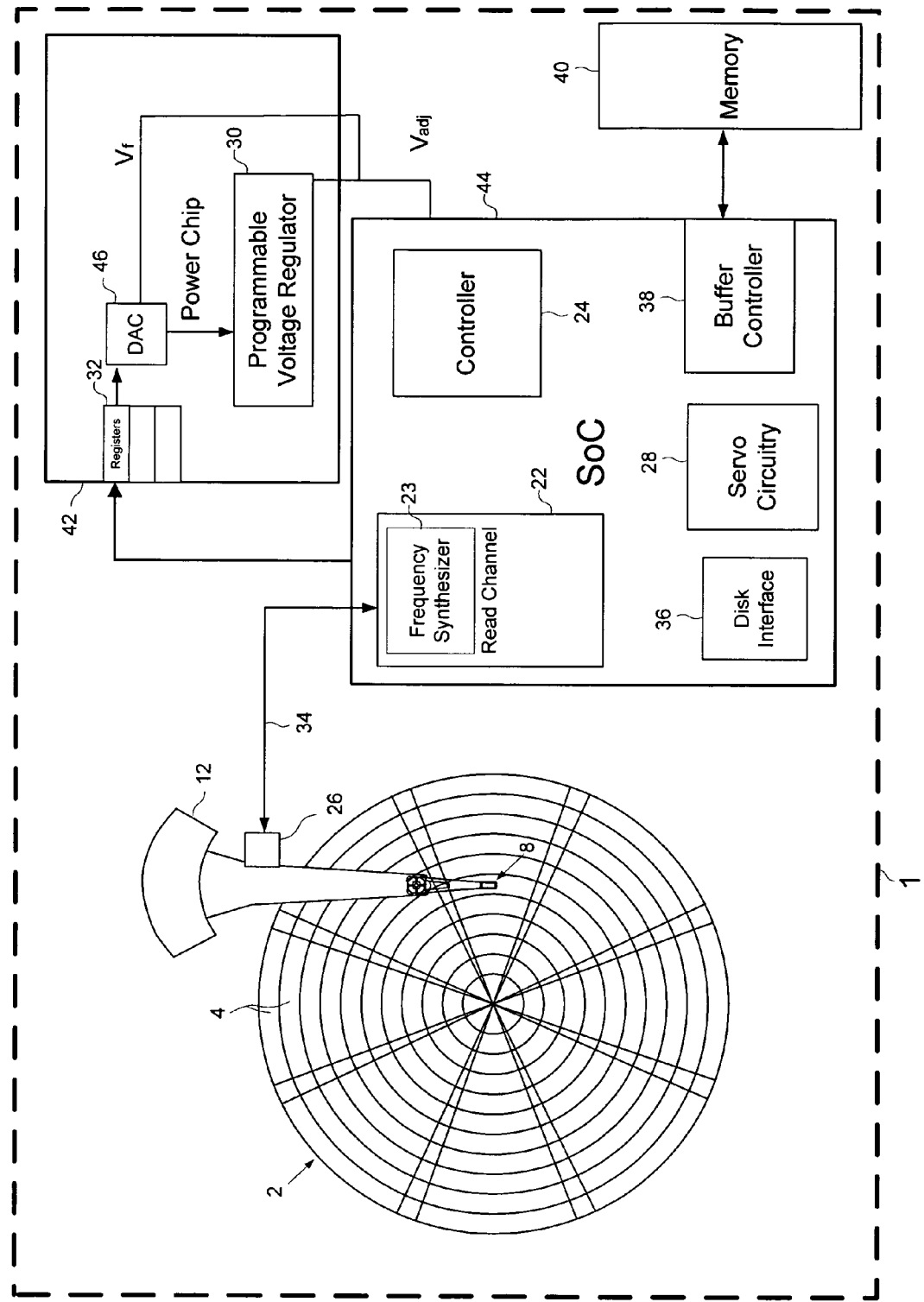
FIG. 2 is a schematic diagram illustrating in greater detail a second exemplary disk drive usable to implement an embodiment of the present invention.

Referring to FIG. 2, in one embodiment, disk drive 1 preferably includes a variety of circuitry for controlling various functions of the drive. In particular embodiments, any or all of this circuitry may comprise the circuitry 20 illustrated in FIG. 2, and may be coupled to the supply voltage and be responsive to the timing frequency provided by the clock 14.

As illustrated, disk drive 1 includes a controller 24 configured to execute at least one control program to control certain functions performed by the drive. For example, the controller 24 may determine which data to send to and receive from a read channel 22. The controller 24 may also perform error correction and detection routines on the data read from the disk 2.

Disk drive 1 also includes read channel 22. The read channel 22 is preferably coupled to a pre-amplifier 26 via a plurality of read and write lines 34. Typically, the pre-amplifier 26 is located on the actuator 10 within the disk drive. During a read operation, pre-amplifier 26 may amplify the analog signal detected by the head 8 in order to achieve a signal level that can be processed by the read channel 22. The read channel 22 then receives the amplified signal via one of the lines 34 and further amplifies, filters and converts the analog pulses into digital data that is output to the controller 24. During a write operation, the read channel 22 receives digital data from the controller 24 and forwards logical signals representative of the digital data to the pre-amplifier 26 via the lines 34.

Of course, the read channel 22 may perform synchronous or asynchronous timing recovery of the data written to the disk 2. U.S. Pat. No. 5,909,332 discloses exemplary methods of such timing recovery, the contents of which are hereby incorporated in their entirety.

In a preferred embodiment, as illustrated in FIG. 2, a frequency synthesizer 23 (which, in one embodiment, comprises clock 14) may be incorporated into the read channel 22. Of course, in other embodiments, the clock may be located anywhere in the disk drive 1 or the disk drive's host.

Disk drive 1 may further comprise servo circuitry 28. In one embodiment, servo circuitry 28 receives a position signal via the pre-amplifier 26 and the read channel 22 and performs calculations to determine the current position of the head 8 over the disk surface. The servo circuitry 28 uses these calculations to control the VCM 12, and to thereby control the position of the head 8.

Disk drive 1 may further include a disk interface 36 that mediates communication with a host. Typically, the disk interface 36 receives commands and data from and transmits status and data to the host. The interface between the host and disk drive 1 may comply with any of a number of electrical engineering standards. In one embodiment, the interface is a serial interface, such as SATA or SAS. In another embodiment, a parallel interface may be used, such as ATA/IDE or SCSI.

As illustrated, in a preferred embodiment, many of these circuit components may be incorporated into a system-on-a-chip (SoC) 44. Thus, a single piece of silicon may incorporate the functionality of many of the above described components. In other embodiments, the components described herein may be implemented on a Printed Circuit Board (PCB) as separate elements.

Disk drive 1 may further comprise a buffer controller 38 and a memory 40. The buffer controller 38 typically arbitrates access to the memory 40, while the memory 40 may be employed to store data from the host that is to be written to the disk 2. The memory 40 may also be used to store data read from the disk 2. Furthermore, the memory 40 may store digital data representative of parameters of the disk drive 1, as well as op codes of control programs for controlling the operations performed by the controller 24. The memory 40 typically comprises random access memory (RAM), such as dynamic RAM, but may comprise any computer-accessible storage, such as flash memory.

Disk drive 1 may further comprise a power chip 42. The power chip 42 is preferably configured to receive power from an external power source (not shown), and to distribute that power to the electrical components of the drive. In a preferred embodiment, the power chip 42 may comprise a VCM driver (not shown) to deliver power to the VCM 12, a spindle motor driver (not shown) to deliver power to a spindle motor, and a circuit driver for delivering power to electronic circuits in the disk drive 1. In a preferred embodiment, the power chip 42 includes a voltage controller, such as voltage controller 18 illustrated in FIG. 1.

As illustrated in FIG. 2, the voltage controller may comprise a programmable voltage regulator 30 configured to deliver an adjustable supply voltage $V_{adj}$ to certain circuitry within the drive. Although the supply voltage is illustrated coupled directly to the SoC 44, it may be understood that this supply voltage $V_{adj}$ may be coupled only to certain circuitry within the SoC 44, while the other circuits may be supplied by other voltages not shown in the Figure. The operation of the programmable voltage regulator 30 will be discussed in further detail below.

In one embodiment, a digital voltage value correlated to a selected zone may be stored in a register 32 on the power chip 42. The register 32 is preferably coupled to the SoC 44, so as to receive the digital voltage value. For example, in one embodiment, the controller 24, upon selecting a zone corresponding to a host command, retrieves a voltage setting corresponding to the selected zone from a table. The controller 24 may then store a digital voltage value corresponding to the voltage setting in the register 32.

This register 32 is preferably coupled to a digital to analog converter (DAC) 46, which is in turn coupled to the programmable voltage regulator 30. In one embodiment, the DAC 46 translates the digital voltage value stored in the register 32 into an analog voltage signal capable of programming the programmable voltage regulator 30. Preferably, the analog voltage signal causes the programmable voltage regulator 30 to adjust the supply voltage $V_{adj}$ in response to the data rate of the selected zone.

In a preferred embodiment, the supply voltage $V_{adj}$ is fed back to the DAC 46 as a feedback voltage $V_f$, such that the DAC 46 may continuously monitor the supply voltage output by the programmable voltage regulator 30, and may thereby compare the output supply voltage $V_{adj}$ with the analog voltage signal. Based on this feedback, the DAC 46 may vary the analog voltage signal as necessary to accurately track the desired supply voltage value.

Thus, the supply voltage $V_{adj}$ powering certain circuitry within the disk drive 1 may thereby be adjusted based at least in part on a selected zone. Of course, in other embodiments, other voltage controllers may be used to accomplish the same or similar results. The register 32 and DAC 46 may also comprise the voltage controller, but may also be implemented as separate components of power chip 42.

As would be well understood by those skilled in the art, many of the circuits discussed above, including the pre-amplifier 26 and many of the components incorporated onto the SoC 44, may be responsive to the timing frequency of a clock (illustrated as frequency synthesizer 23 in FIG. 2). For example, circuitry comprising the read channel 22 is typically directly responsive to a timing frequency. When writing data to the disk 2, the read channel 22 times the logical signals sent to the pre-amplifier 26 according to the timing frequency of a write clock. Similarly, when reading data from the disk 2, the read channel 22 may sample the analog signal received from the pre-amplifier 26 at intervals corresponding to the timing frequency of a read clock. In a preferred embodiment, the frequency synthesizer 23 comprises the read clock and the write clock; although in alternative embodiments, the read and write clocks may, of course, be implemented by different circuitry.

Preferably, the pre-amplifier 26 is also responsive to the timing frequency of a clock, as the current modulations caused by the pre-amplifier are faster or slower according to the timing frequency of the write clock, as discussed above. As would be well understood by those skilled in the art, other circuitry within the disk drive, such as the controller 24, may also be responsive to the frequency of a clock. For example, as the controller 24 is performing error correction routines on data received from the read channel 22, the speed at which the controller 24 must process this data is reduced as the frequency at which the data is sent from the read channel 22 decreases. In some implementations, the servo circuitry 28 may also be responsive to a clock, if, for example, the servo patterns written to the disk 2 are written at a data rate that varies across the disk.

As the timing frequency of the clock decreases, thereby decreasing the frequency at which signals are driven through certain circuitry, the power necessary to drive the circuitry also decreases. Thus, in general, the supply voltage $V_{adj}$ delivered to the circuitry may decrease with decreasing timing frequency.

Figure 3:
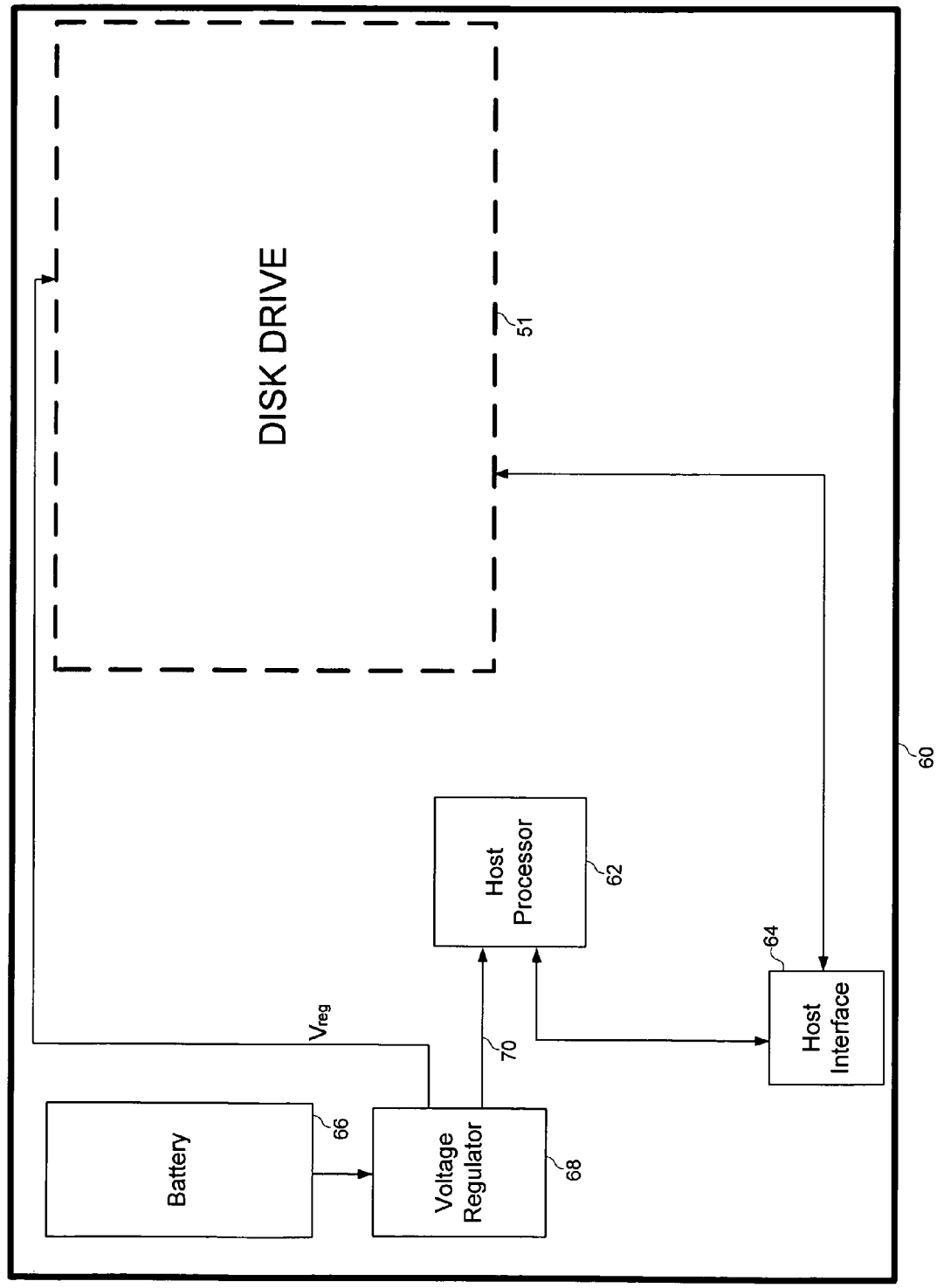
FIG. 3 is a schematic diagram illustrating an exemplary disk drive usable to implement an embodiment of the present invention housed within a mobile device.

Referring to FIG. 3, a mobile device 60 may comprise a disk drive 51, and a battery 66 coupled to a voltage regulator 68, which operates to take the power output from the battery 66 and deliver appropriate voltages to all of the components within the device 60. So, for example, the voltage regulator 68 may deliver a voltage 70 to the host processor 62 within the mobile device 60, and may deliver another regulated voltage $V_{reg}$ to the disk drive 51.

Moreover, in one embodiment, the voltage regulator 68 may include a voltage controller operable to adjust a supply voltage $V_{adj}$ provided to circuitry within the disk drive 51. Thus, in one embodiment, the disk drive 51 may operate using supply voltage supplied directly from the voltage regulator 68 and may not have a separate voltage controller, such as the voltage controller 18 shown in FIG. 1. In another embodiment, the disk drive 51 may be configured identically to disk drive 1, illustrated in FIGS. 1 and 2, including the voltage controller 18.

With reference to FIG. 5, the steps of one embodiment of the present invention may be described in the context of the disk drive 1 shown in FIGS. 1 and 2. During operation, the disk drive 1 receives a host command (see FIG. 1), step 100. The disk drive 1 receives the host command through a disk interface 36 from a corresponding host interface 64. The host command may be sent from any host, such as the mobile device 60 shown in FIG. 3, and is typically issued by the host processor 62. The host may comprise any of a variety of computing devices, such as cellular phones, laptops, PDAs, desktop computers, RAID servers, portable media players, consumer electronic devices, etc.

In one embodiment, the host command may comprise a read or write command requesting data to be written to or read from the disk 2. If the command is a write command, the host 60 typically forwards data, along with a logical block address (LBA) designating a virtual location to which the forwarded data should be written. If the command is a read command, the host typically sends a LBA corresponding to the data the host wishes to receive back from the disk drive 1.

Based on the host command, the disk drive 1 preferably selects one of a plurality of zones 4, step 102. In one embodiment, the memory 40 of the disk drive 1 stores a plurality of tables, as may be seen in FIG. 4. One of those tables is a LBA to physical location table, illustrated as a LBA to cylinder-head-sector (CHS) table 70 and a defect management table 72. In one embodiment, these two tables translate the host LBA into a physical location on the disk 2 where the data corresponding to the host LBA may be accessed. The defect management table 72 ensures that any bad sectors on the disk 2 are not written to or read from. Of course, in other embodiments, an algorithm or a plurality of algorithms may be used to determine the physical location.

Figure 4:
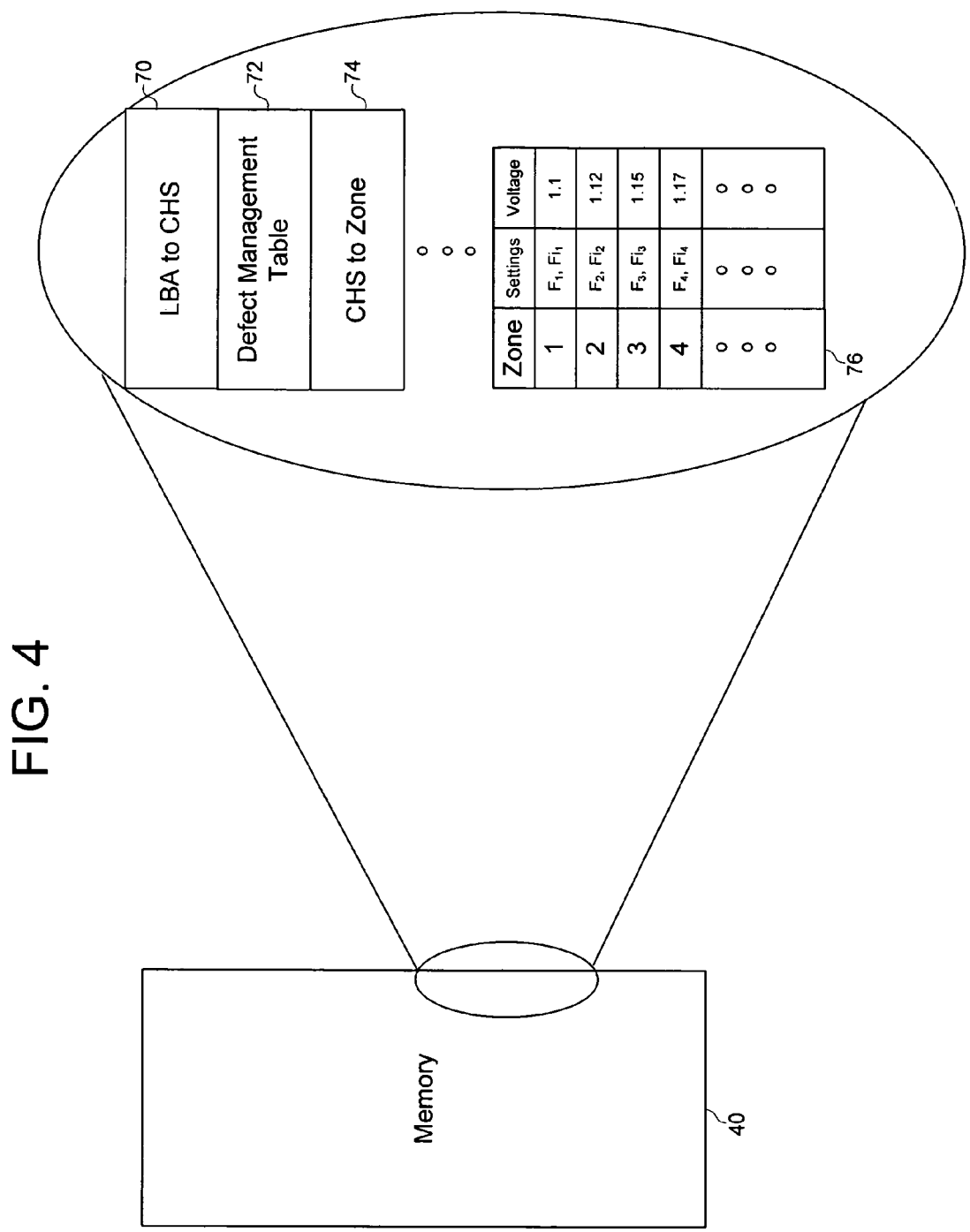
FIG. 4 is a schematic diagram illustrating in further detail an exemplary data structure that may be used to implement an embodiment of the present invention.

As discussed above, in one embodiment, the data is written to and read from the disk 2 at different frequencies according to conventional zone recording techniques. Thus, another table 74 may be stored in the memory 40 (as illustrated in FIG. 4) to facilitate translation of the physical location (CHS) to a selected zone 4. This zone information is used to determine the particular data rate that will be used to read and write from this region of the disk 2.

Once the physical location on the disk 2 corresponding to the LBA of the host command is known, the servo circuitry 28 of the disk drive 1 may seek the appropriate head to the appropriate cylinder.

Preferably, another table 76 stored in the memory 40 is also accessed. This table 76 correlates the different zones with read/write settings, as well as voltage settings. The table 76 may be used to store the timing frequency of the clock 14 that corresponds to the selected zone, so that the timing frequency may be adjusted based at least in part on the selected zone, step 104. The timing frequency of the clock 14 is preferably adjusted to match the value for the frequency, $F_n$, stored in the table 76. In a preferred embodiment, the controller 24 accesses the stored table 76, and sets the timing frequency of the clock 14 to match the appropriate value stored in the table. This operation may be performed by setting a digital value that controls the frequency synthesizer 23, or by, for example, varying the voltage input to a VCO according to the new frequency value, $F_n$. Other parameters of the disk drive 1 may also be adjusted based on the selected zone.

A supply voltage $V_{adj}$ provided to circuitry 20 is also adjusted based at least in part on the selected zone 4, step 104. In one embodiment, the supply voltage values are stored in the zone settings table 76 in the memory 40. In another embodiment, an algorithm may be stored that performs a translation between the zone or associated timing frequency, and the supply voltage value.

As described above, as the timing frequency of the clock 14 is reduced, the supply voltage $V_{adj}$ provided to the circuitry 20 may also be reduced. Thus, in one embodiment, since the data rates and timing frequencies of zones 4 closer to the center of the disk 2 are reduced compared to the data rates and timing frequencies of zones 4 farther from the center, zones 4 closer to the center of the disk 2 may also be correlated with lower supply voltages $V_{adj}$ than zones 4 farther from the center. Thus, the supply voltage provided to the circuitry 20 may be reduced if the currently selected zone is closer to the center of the disk 2 than a previously selected zone. In other words, if the data rate of a currently accessed zone is lower than the data rate of a previously accessed zone, the voltage controller 18 is preferably configured to reduce the supply voltage provided to the circuitry 20.

What is claimed is:

1. A method for power conservation in a disk drive having a disk comprising a plurality of zones, a clock for generating a timing signal having a timing frequency, a head for accessing the plurality of zones, a voltage controller for providing a supply voltage, and circuitry coupled to the supply voltage and responsive to the timing frequency, the method comprising:
   receiving a host command;
   selecting one of the plurality of zones based on the host command; and
   adjusting the timing frequency and the supply voltage provided to the circuitry based at least in part on the selected zone.

2. The method of claim 1, wherein the circuitry comprises a read channel.

3. The method of claim 1, wherein the circuitry comprises a controller.

4. The method of claim 1, wherein the voltage controller comprises a programmable voltage regulator, and adjusting the timing frequency and the supply voltage comprises programming the programmable voltage regulator.

5. The method of claim 1, wherein adjusting the timing frequency and the supply voltage comprises reducing the supply voltage provided to the circuitry if the selected zone is closer to the center of the disk than a previously selected zone.

6. The method of claim 1, wherein adjusting the timing frequency and the supply voltage comprises reducing the supply voltage provided to the circuitry if the timing frequency is lowered.

7. The method of claim 1, further comprising sampling a read signal representing data stored in the selected zone at the timing frequency.

8. The method of claim 1, further comprising writing data to the selected zone at the timing frequency.

9. The method of claim 1, further comprising storing most frequently accessed data in zones closest to the center of the disk.

10. The method of claim 1, wherein the circuitry comprises a pre-amplifier.

11. The method of claim 1, wherein the circuitry comprises servo circuitry.

12. A disk drive comprising:
   a disk having a plurality of zones, wherein a first zone comprises data recorded at a first data rate;
   a head actuated over the disk for generating a signal representing the data;

a clock for generating a timing signal having a timing frequency, and for adjusting the timing frequency in response to the first data rate;

circuitry responsive to the timing frequency; and a voltage controller for adjusting a supply voltage provided to the circuitry in response to the first data rate.

13. The disk drive of claim 12, wherein the circuitry comprises a pre-amplifier.

14. The disk drive of claim 12, wherein the circuitry comprises a read channel configured to perform synchronous timing recovery of the data.

15. The disk drive of claim 12, wherein the circuitry comprises a read channel configured to perform asynchronous timing recovery of the data.

16. The disk drive of claim 12, wherein the voltage controller comprises a programmable voltage regulator.

17. The disk drive of claim 16, wherein the voltage controller further comprises a register for receiving a digital voltage value, and wherein the programmable voltage regulator is configured to adjust the supply voltage in response to the digital voltage value.

18. The disk drive of claim 12, wherein the voltage controller is configured to reduce the supply voltage if the first data rate is lower than a previous data rate.

19. The disk drive of claim 12, wherein the circuitry comprises a controller.

20. The disk drive of claim 12, wherein the circuitry comprises servo circuitry.

21. A method for power conservation in a mobile device having a host processor for issuing host commands, a battery, a voltage controller coupled to the battery for providing a supply voltage, a disk comprising a plurality of zones, a head for accessing the plurality of zones, a clock for generating a timing signal having a timing frequency, and circuitry coupled to the supply voltage and responsive to the timing frequency, the method comprising:

generating a host command;

selecting one of the plurality of zones based on the host command; and adjusting the timing frequency and the supply voltage provided to the circuitry based at least in part on the selected zone.

22. The method of claim 21, wherein the circuitry comprises a read channel.

23. The method of claim 21, wherein the circuitry comprises a controller.

24. The method of claim 21, wherein the circuitry comprises a pre-amplifier.

25. The method of claim 21, wherein the circuitry comprises servo circuitry.

26. The method of claim 21, wherein the voltage controller comprises a programmable voltage regulator, and adjusting the timing frequency and the supply voltage comprises programming the programmable voltage regulator.

27. The method of claim 21, wherein adjusting the timing frequency and the supply voltage comprises reducing the supply voltage provided to the circuitry if the selected zone is closer to the center of the disk than a previously selected zone.

28. A mobile device comprising:

a host processor for issuing host commands;

a battery;

a disk having a plurality of zones, wherein a first zone comprises data recorded at a first data rate;

a head actuated over the disk for generating a signal representing the data;

a clock for generating a timing signal having a timing frequency, and for adjusting the timing frequency in response to the first data rate;

circuitry responsive to the timing frequency; and a voltage controller coupled to the battery and for adjusting a supply voltage provided to the circuitry in response to the first data rate.

29. The mobile device of claim 28, wherein the mobile device comprises a disk drive housing the disk, the head, the clock, the circuitry, and the voltage controller.

* * * * *